(12) United States Patent
Ando et al.

(10) Patent No.: US 12,358,572 B2
(45) Date of Patent: Jul. 15, 2025

(54) VEHICLE LOWER STRUCTURE

(71) Applicant: Honda Motor Co., Ltd., Tokyo (JP)

(72) Inventors: Kenichi Ando, Saitama (JP); Kei Ambo, Tokyo (JP); Yoshiteru Hoshida, Tokyo (JP); Yuki Nakamura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 422 days.

(21) Appl. No.: 18/156,350

(22) Filed: Jan. 18, 2023

(65) Prior Publication Data

US 2023/0242193 A1 Aug. 3, 2023

(30) Foreign Application Priority Data

Jan. 28, 2022 (CN) .......................... 202210105386.7

(51) Int. Cl.
*B62D 35/02* (2006.01)
*B62D 37/02* (2006.01)

(52) U.S. Cl.
CPC ............. *B62D 35/02* (2013.01); *B62D 37/02* (2013.01)

(58) Field of Classification Search
CPC .... B62D 35/02; B62D 35/005; B62D 35/007; B62D 35/008; B62D 37/02; Y02T 10/82
USPC ................. 296/180.1, 180.2, 180.3
See application file for complete search history.

(56) References Cited

U.S. PATENT DOCUMENTS 10,953,934 B2 3/2021 Herlem

FOREIGN PATENT DOCUMENTS

| DE | 102008058993 A1 * | 5/2010 | ............. B62D 35/02 |
| EP | 3006249 A1 * | 4/2016 | ............. B60K 11/04 |

OTHER PUBLICATIONS

English of DE102008058993A1 (Year: 2010).*

* cited by examiner

*Primary Examiner* — Lori Lyjak
(74) *Attorney, Agent, or Firm* — JCIPRENT (57) ABSTRACT

A vehicle lower structure includes a deflector panel provided on a vehicle body of a vehicle and movable between a stored position covering a lower portion of the vehicle body and an unfolded position protruding downwards. The deflector panel includes a front deflector panel and a rear deflector panel. The front deflector panel is rotatably arranged on the vehicle body along a first rotation axis with a front end thereof. The rear deflector panel is rotatably arranged on a rear end of the front deflector panel along a second rotation axis with a front end thereof and is rotatably and slidably arranged on the vehicle body along a third rotation axis in a vehicle front-rear direction with a rear end thereof. The rear deflector panel is provided with a guide member protruding upwards. The guide member is covered from above by a covering portion formed on the vehicle body.

6 Claims, 8 Drawing Sheets

VEHICLE LOWER STRUCTURE

CROSS-REFERENCE TO RELATED APPLICATION

This application claims the priority benefit of China application no. CN, 202210105386.7, filed on Jan. 28, 2022. The entirety of the above-mentioned patent application is hereby incorporated by reference herein and made a part of this specification.

BACKGROUND

Technical Field

The disclosure relates to a vehicle structure, and in particular, relates to a vehicle lower structure.

Description of Related Art

In the related art, a vehicle lower structure formed by a plurality of panels or frames is mounted on the vehicle body of the vehicle. The appearance of the vehicle is designed with an aim to improve the energy efficiency of the vehicle and lower the impact of the vehicle on the destruction of the natural environment. In order to further improve the aerodynamic performance, it is necessary to create an aerodynamically favorable flow through pressure distribution control in addition to the fairing effect of the existing under cover. For instance, patent literature 1 (US Patent Publication No. U.S. Pat. No. 10,953,934B2) discloses a vehicle body lower structure including a deflector panel movable between a stored position covering the lower portion of the vehicle body and an unfolded position protruding downwards, so as to further improve the aerodynamic performance of the center lower part of the vehicle. However, while improving the plate body of the vehicle lower structure, it is also necessary to consider the arrangement of the parts originally installed in the lower portion of the vehicle body. Therefore, there is a need to develop a mass-produced device that meet both aerodynamic performance and arrangement requirements.

SUMMARY

The disclosure provides a vehicle lower structure including a deflector panel provided on a vehicle body of a vehicle and movable between a stored position covering a lower portion of the vehicle body and an unfolded position protruding downwards. The deflector panel includes a front deflector panel and a rear deflector panel. The front deflector panel is rotatably arranged on the vehicle body along a first rotation axis with a front end thereof. The rear deflector panel is rotatably arranged on a rear end of the front deflector panel along a second rotation axis with a front end thereof and is rotatably and slidably arranged on the vehicle body along a third rotation axis in a vehicle front-rear direction with a rear end thereof. The rear deflector panel is provided with a guide member protruding upwards. The guide member is covered from above by a covering portion formed on the vehicle body.

In order to make the aforementioned and other features and advantages of the invention more comprehensible, several embodiments accompanied with figures are described in detail below.

DESCRIPTION OF THE EMBODIMENTS

The disclosure provides a vehicle lower structure capable of rectifying the airflow on a deflector panel to improve the aerodynamic performance and suppressing a guide member provided on the deflector panel from being detached from a vehicle body.

The disclosure provides a vehicle lower structure including a deflector panel provided on a vehicle body of a vehicle and movable between a stored position covering a lower portion of the vehicle body and an unfolded position protruding downwards. The deflector panel includes a front deflector panel and a rear deflector panel. The front deflector panel is rotatably arranged on the vehicle body along a first rotation axis with a front end thereof. The rear deflector panel is rotatably arranged on a rear end of the front deflector panel along a second rotation axis with a front end thereof and is rotatably and slidably arranged on the vehicle body along a third rotation axis in a vehicle front-rear direction with a rear end thereof. The rear deflector panel is provided with a guide member protruding upwards. The guide member is covered from above by a covering portion formed on the vehicle body.

In an embodiment of the disclosure, the guide member has a guide pin extending in a vehicle left-right direction. The covering portion has guide groove corresponding to the guide pin. The guide pin is provided in the guide groove and is configured to be movable along the guide groove.

In an embodiment of the disclosure, the vehicle body includes a front frame and a rear frame connected to each other. The front frame supports the front deflector panel to be rotatable via the first rotation axis, and the rear frame supports the rear deflector panel to be rotatable via the third rotation axis and slidable in the vehicle front-rear direction.

In an embodiment of the disclosure, the covering portion is disposed on the rear frame and is configured to be embedded in a concave portion formed on the front frame.

To sum up, in the vehicle lower structure provided by the disclosure, the deflector panel is divided into the front deflector panel and the rear deflector panel. When the deflector panel is in the unfolded position, the rear deflector panel slides forwards through the guidance of the guide member, so that the flow velocity of the airflow may be increased along the deflector panel. Further, the rear deflector panel is provided with the guide member protruding upwards, and the guide member is covered from above by the covering portion formed on the vehicle body. Therefore, even if the rear deflector panel is deformed, the guide member may not be detached easily from the covering portion. Accordingly, the vehicle lower structure provided by the disclosure may rectify the airflow on the deflector panel to improve the aerodynamic performance and suppress the guide member provided on the deflector panel from being detached from the vehicle body.

Figure 1:
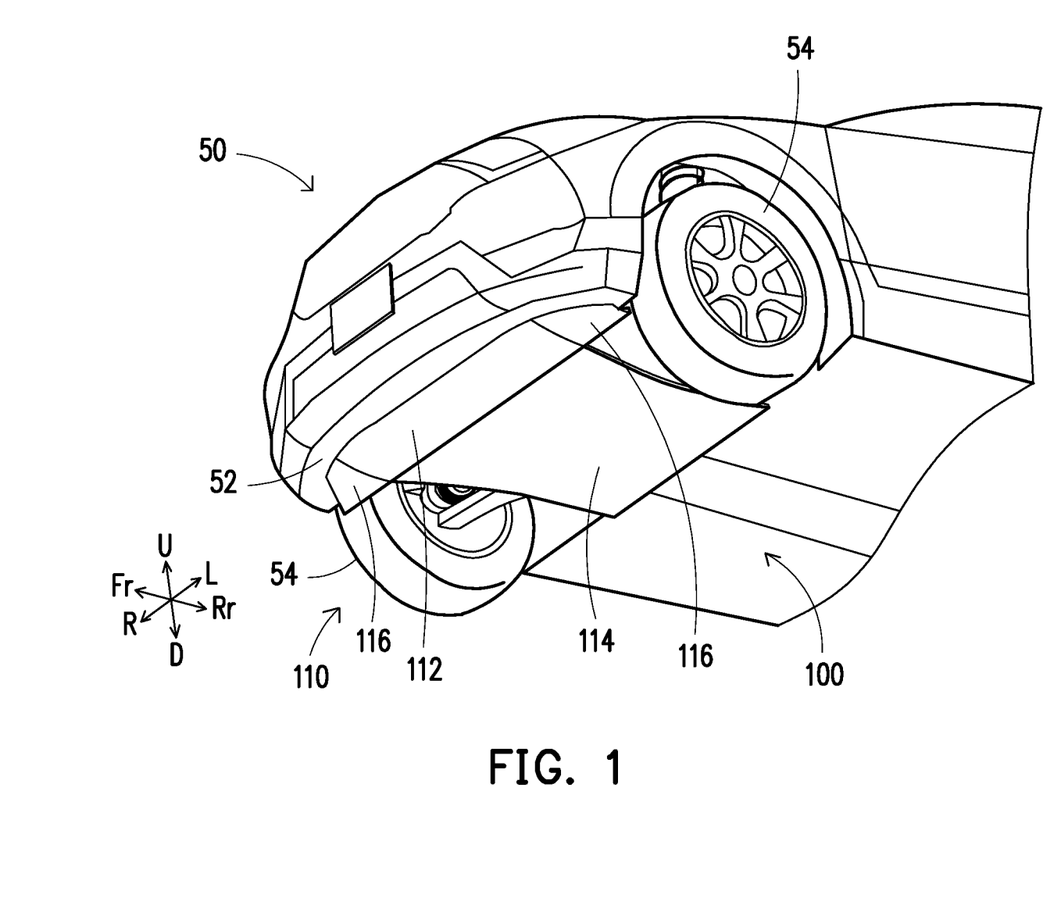
FIG. 1 is schematic three-dimensional view of a vehicle lower structure applied on a vehicle body of a vehicle according to an embodiment of the disclosure.
Figure 2:
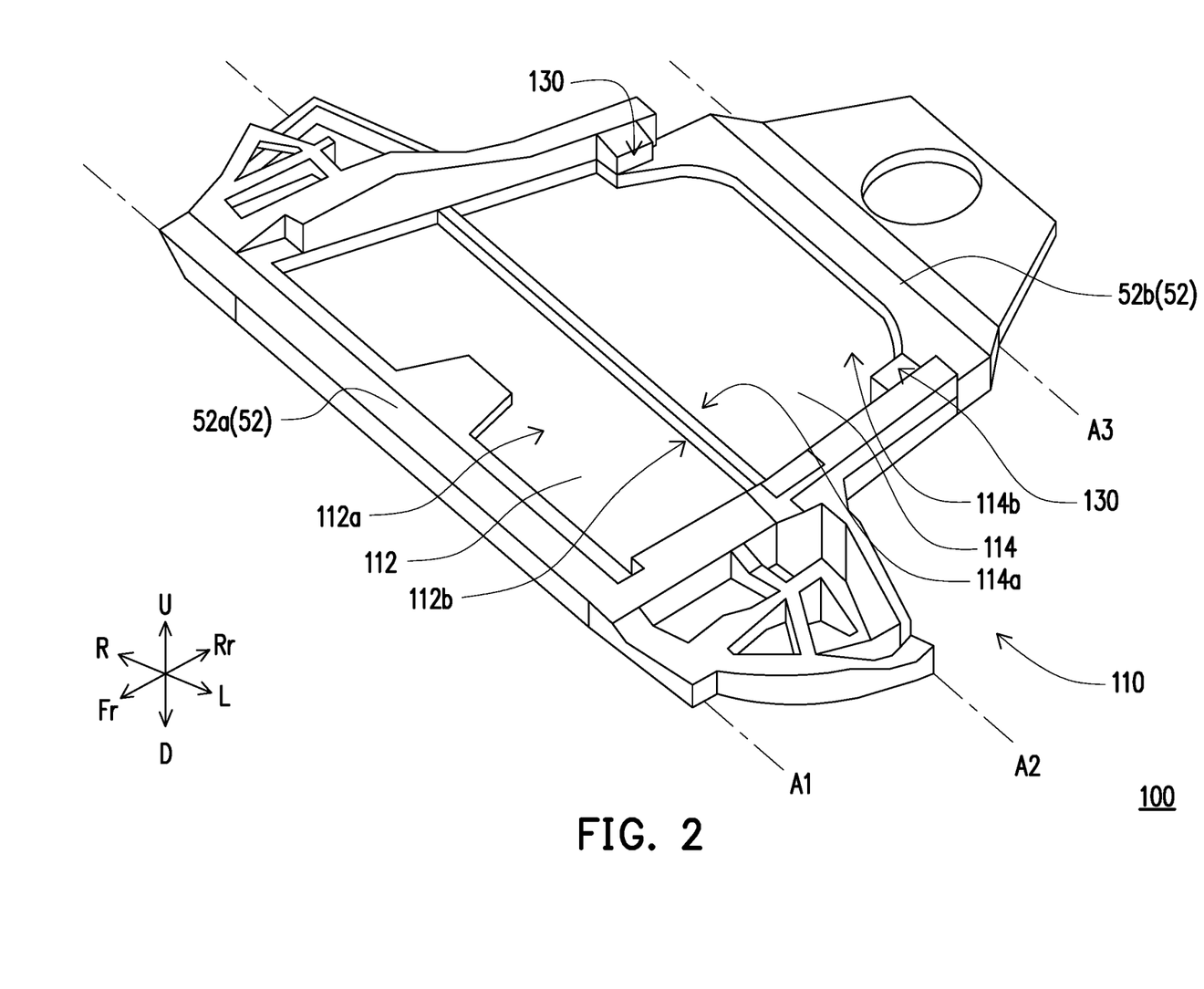
FIG. 2 is a schematic three-dimensional view of the vehicle lower structure shown in FIG. 1 when viewed from the front to the rear and from the top to the bottom.
Figure 3A:
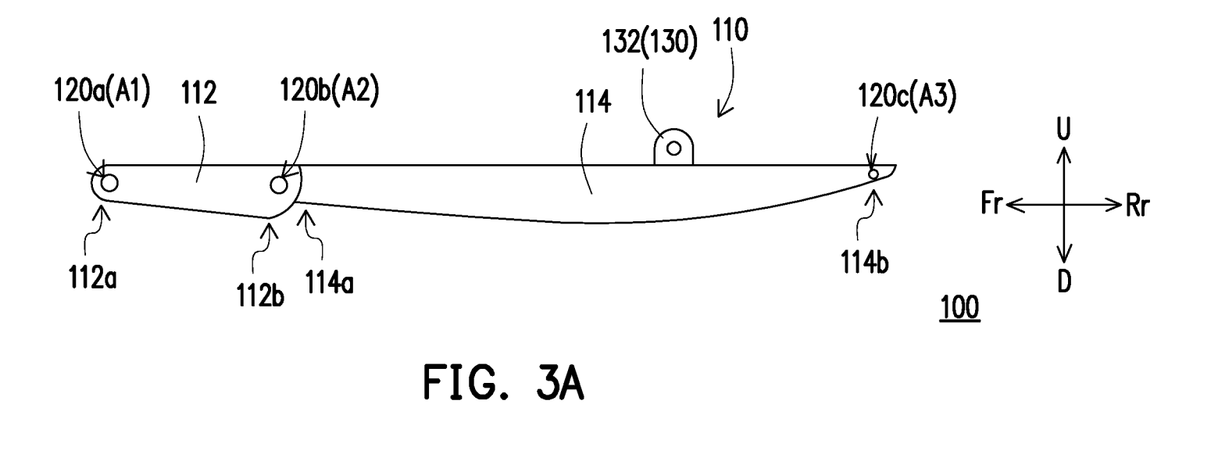
FIG. 3A and FIG. 3B are schematic side views of a deflector panel used in the vehicle lower structure shown in FIG. 2 in a stored position and an unfolded position.
Figure 3B:
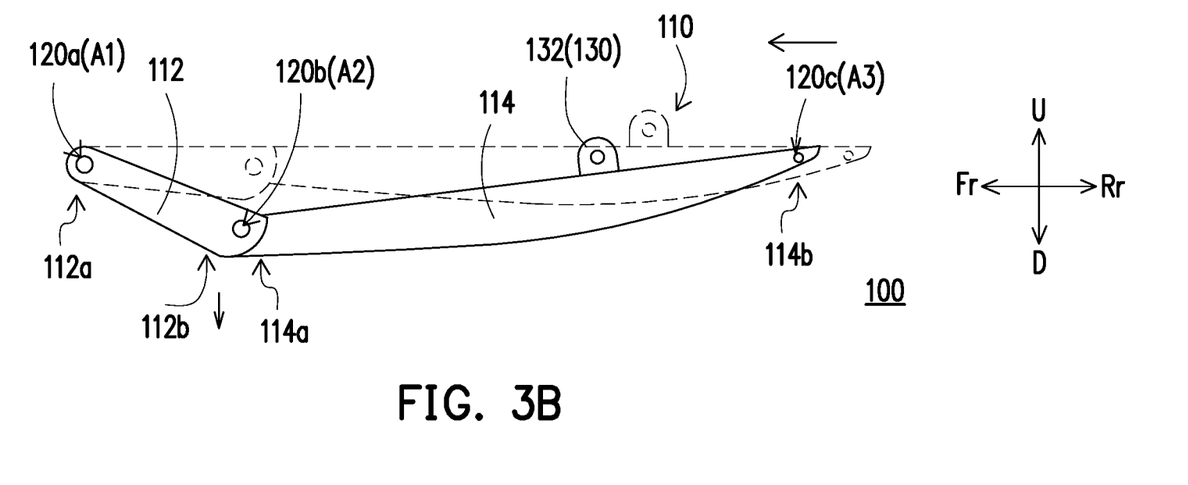
Figure 4:
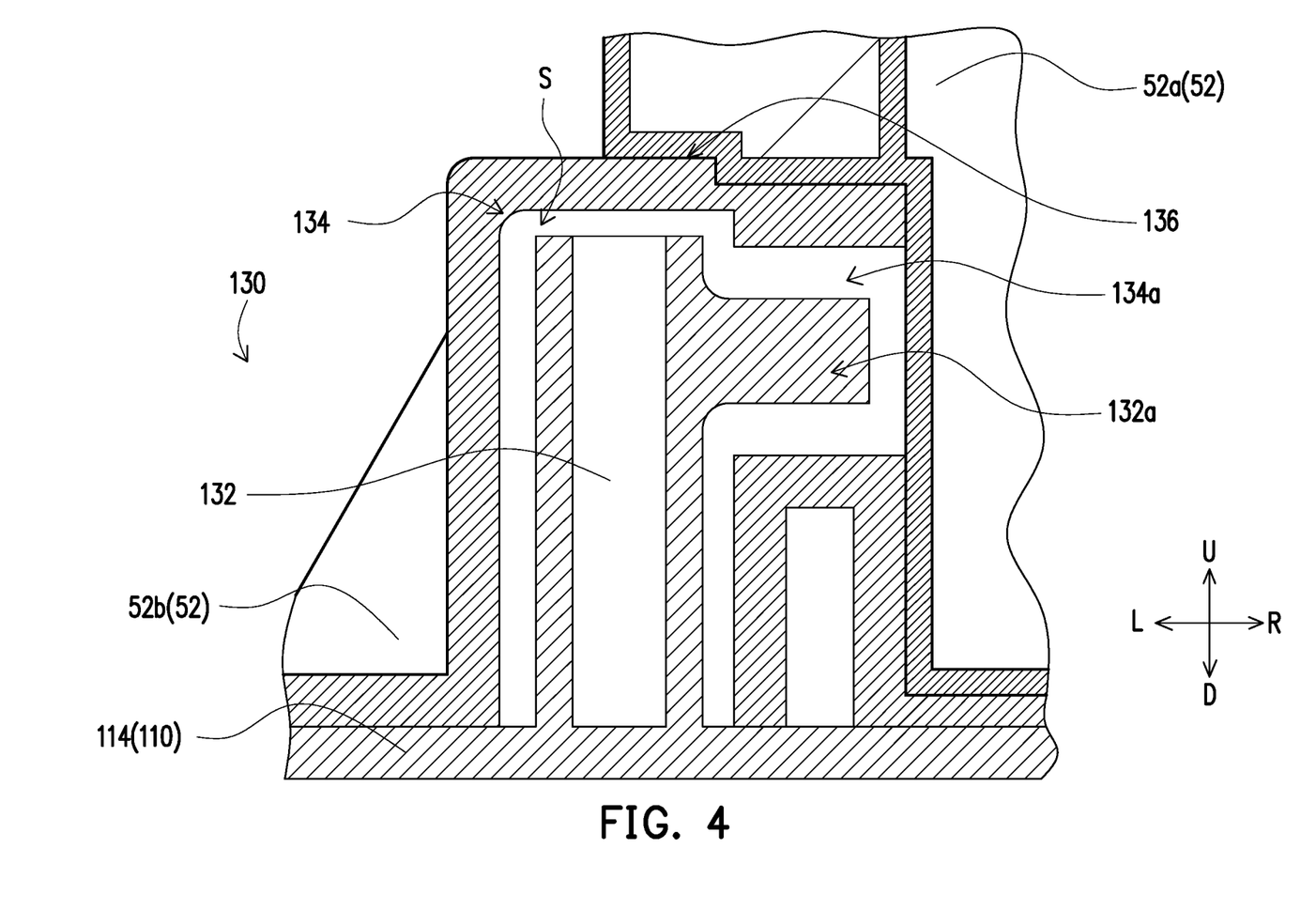
FIG. 4 is a local schematic cross-sectional view of the vicinity of a guide member of the vehicle lower structure shown in FIG. 2 in a vehicle left-right direction.
Figure 5:
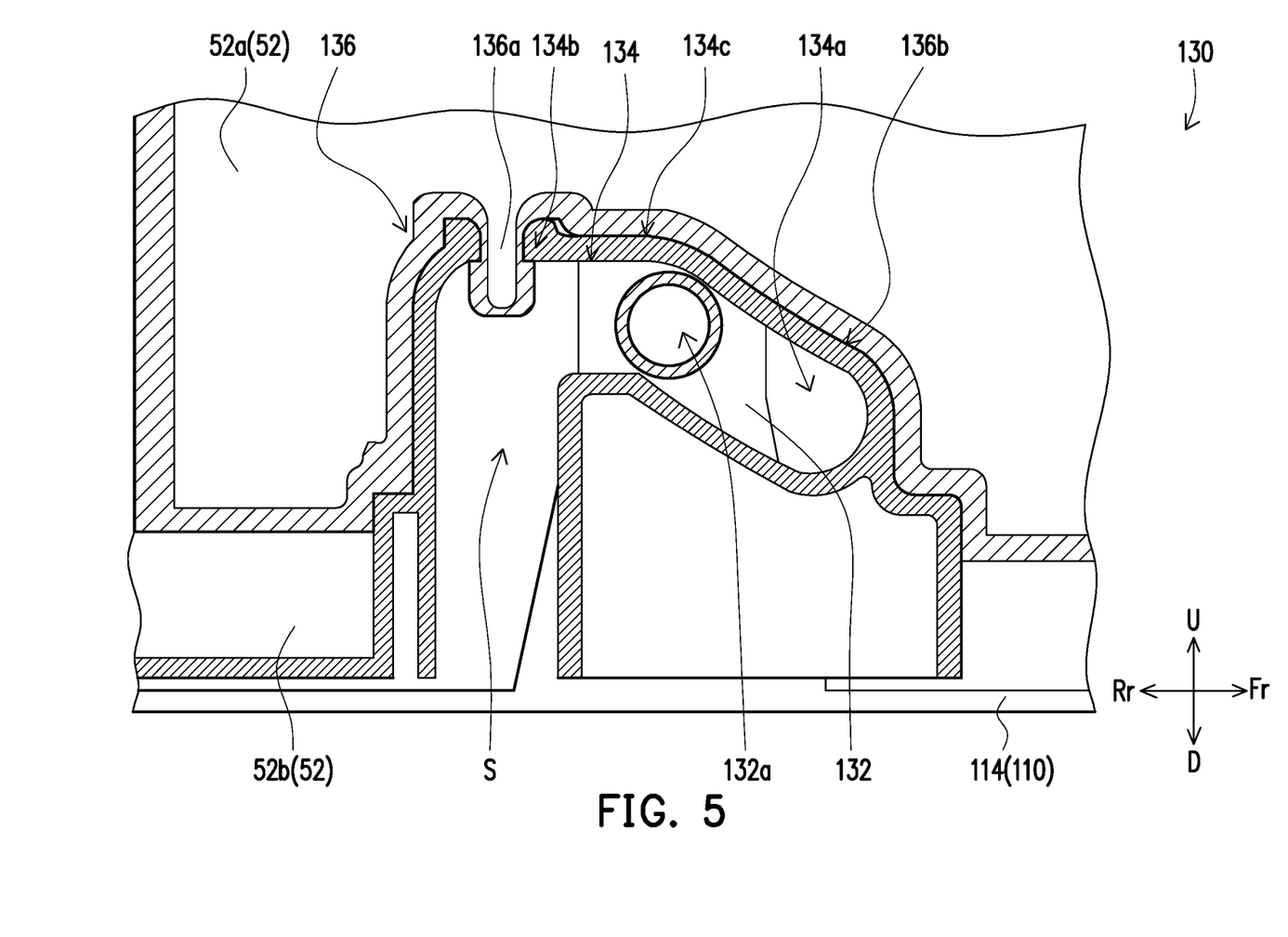
FIG. 5 is a local schematic cross-sectional view of the vicinity of the guide member of the vehicle lower structure shown in FIG. 4 in a vehicle front-rear direction.
Figure 6:
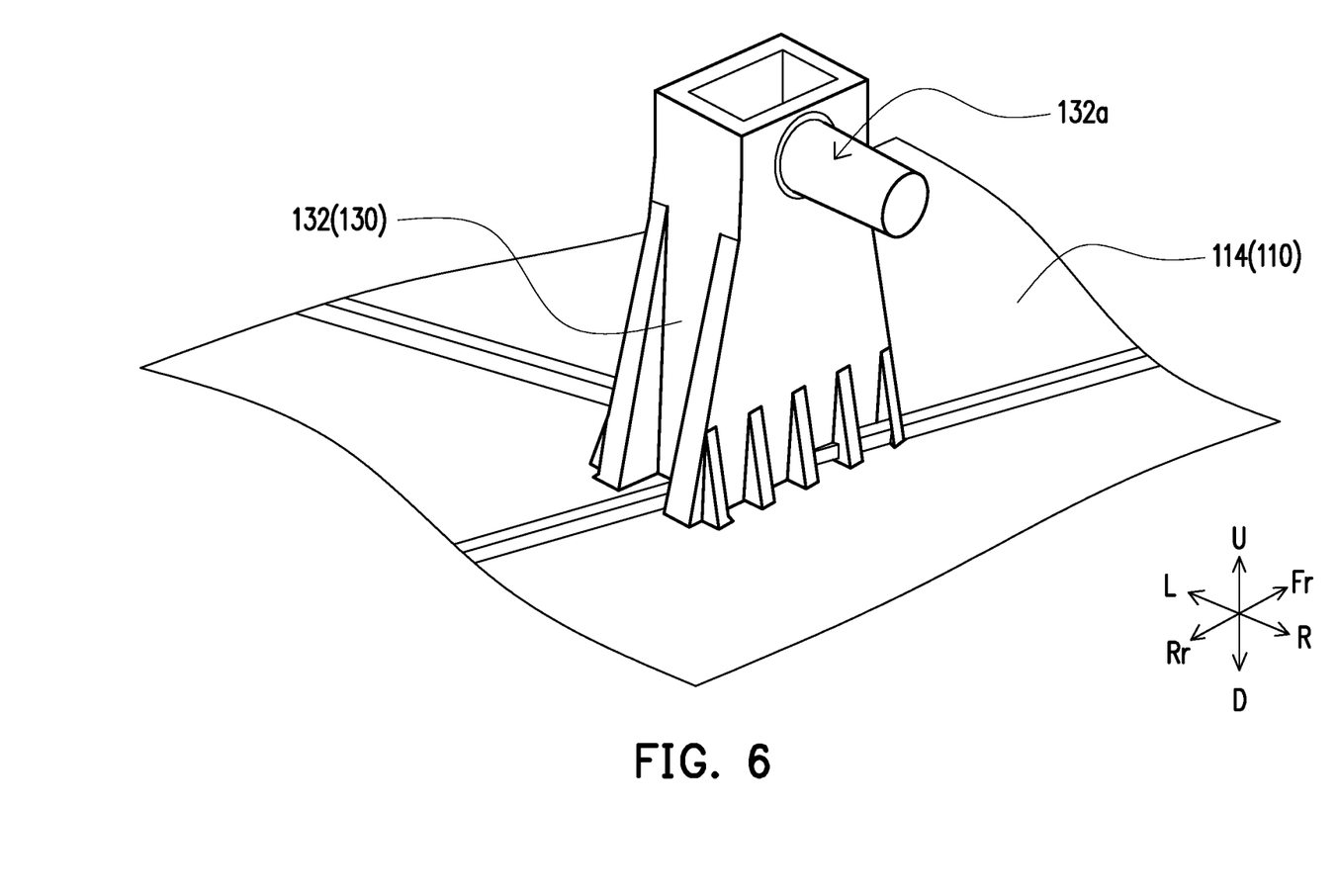
FIG. 6 is a local schematic oblique view of the guide member disposed on a rear deflector panel of the vehicle lower structure shown in FIG. 4.
Figure 7:
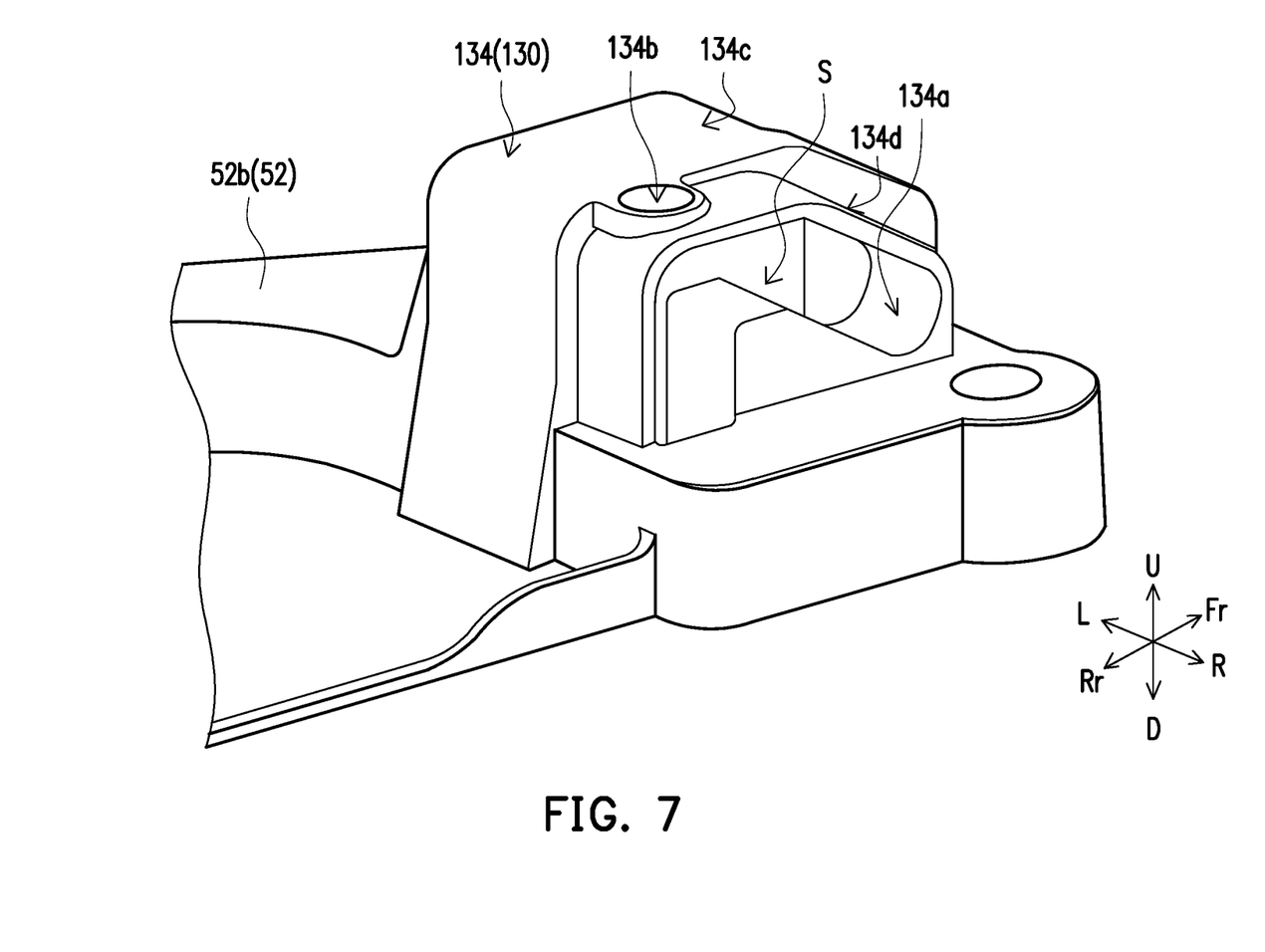
FIG. 7 is a local schematic oblique view of a covering portion disposed on a rear frame of the vehicle lower structure shown in FIG. 4.
Figure 8:
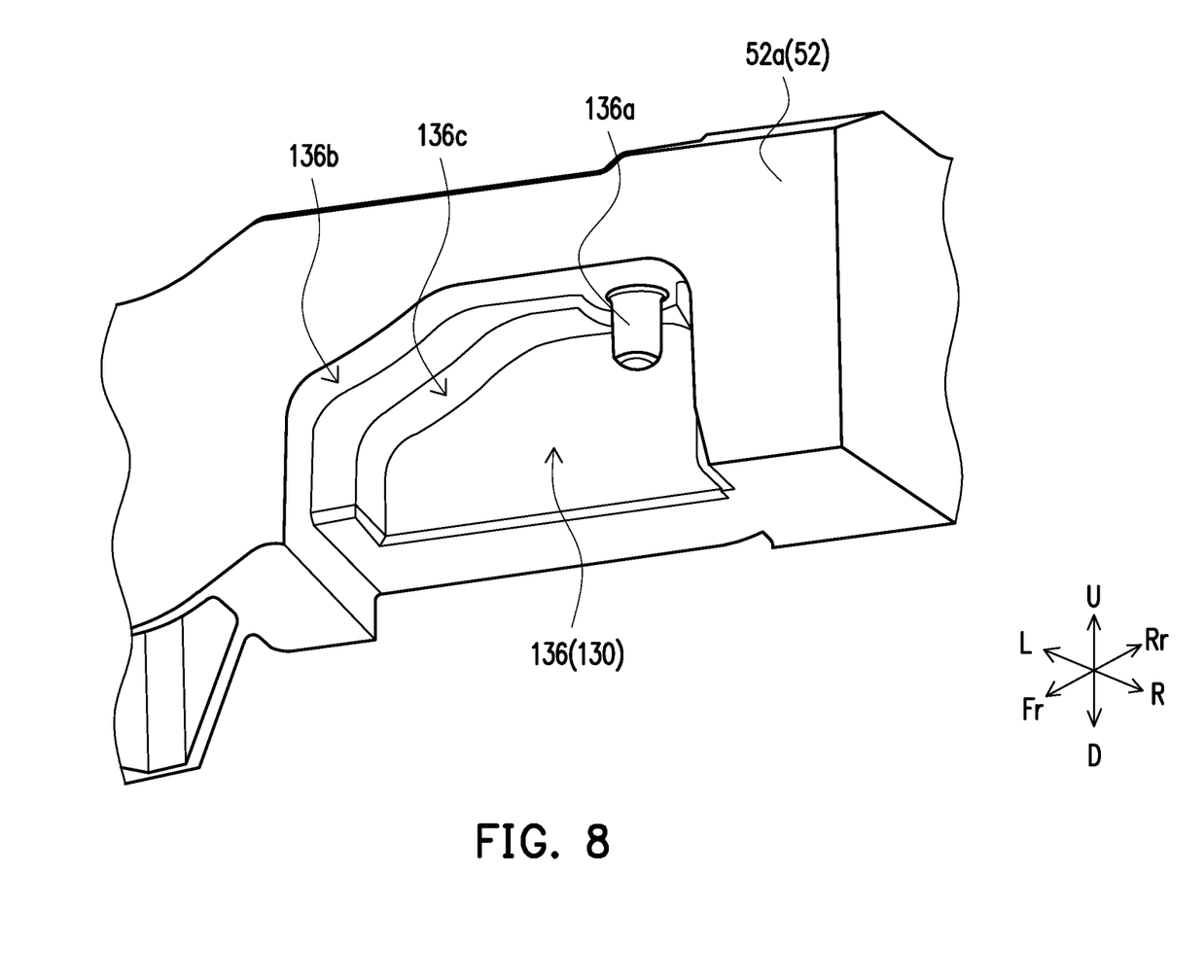
FIG. 8 is a local schematic oblique view of a concave portion disposed on a front frame of the vehicle lower structure shown in FIG. 4.

Descriptions of the disclosure are given with reference to the exemplary embodiments illustrated by the accompanying drawings. Herein, FIG. 1 is schematic three-dimensional view of a vehicle lower structure applied on a vehicle body of a vehicle according to an embodiment of the disclosure. FIG. 2 is a schematic three-dimensional view of the vehicle lower structure shown in FIG. 1 when viewed from the front to the rear and from the top to the bottom. FIG. 3A and FIG. 3B are schematic side views of a deflector panel used in the vehicle lower structure shown in FIG. 2 in a stored position and an unfolded position. FIG. 4 is a local schematic cross-sectional view of the vicinity of a guide member of the vehicle lower structure shown in FIG. 2 in a vehicle left-right direction. FIG. 5 is a local schematic cross-sectional view of the vicinity of the guide member of the vehicle lower structure shown in FIG. 4 in a vehicle front-rear direction. FIG. 6 is a local schematic oblique view of the guide member disposed on a rear deflector panel of the vehicle lower structure shown in FIG. 4. FIG. 7 is a local schematic oblique view of a covering portion disposed on a rear frame of the vehicle lower structure shown in FIG. 4. FIG. 8 is a local schematic oblique view of a concave portion disposed on a front frame of the vehicle lower structure shown in FIG. 4. The applications and the specific structure of a vehicle lower structure 100 provided by the present embodiment will be described below together with FIG. 1 to FIG. 8. Herein, in the following paragraphs, a vehicle front-rear direction, for example, refers to a vehicle front direction Fr and a vehicle rear direction Rr in the drawings. A vehicle left-right direction refers to, for example, a vehicle left direction L and a vehicle right direction R in the drawing. Further, a vehicle up-down direction, for example, refers to a vehicle up direction U and a vehicle down direction D in the drawings. However, this is only one example of the disclosure, and the disclosure is not limited thereto.

With reference to FIG. 1 and FIG. 2, in this embodiment, the vehicle lower structure 100 is adapted to be disposed in a lower portion of a vehicle 50 (shown in FIG. 1), for example, in the lower portion in front of the vehicle 50, and is adjacent to a pair of left and right front wheels 54 disposed in front of a vehicle body 52 of the vehicle 50. Herein, the vehicle lower structure 100 includes a deflector panel 110 provided on the vehicle body 52 (as shown in FIG. 1) of the vehicle 50 and movable between a stored position (as shown in FIG. 3A) covering the lower portion of the vehicle body 52 and an unfolded position (as shown in FIG. 3B) protruding downwards. The deflector panel 110 is disposed on the vehicle body 52, for example, is rotatably disposed on the vehicle body 52. Herein, covering the lower portion of the vehicle body 52 means that the deflector panel 110 shields at least a portion of the lower portion of the vehicle body 52, but is not limited to the fact that the deflector panel 110 is parallel to the horizontal plane where the vehicle 50 is located or the flat surface formed by the vehicle body 52. When the deflector panel 110 is in the stored position, an included angle may also be provided to present an inclination. The unfolded position refers to a position further downwards than the stored position. When the vehicle 50 is running, the deflector panel 110 is moved from the stored position (as shown in FIG. 3A) to the unfolded position (as shown in FIG. 3B), so that the airflow flowing from the front to the rear (e.g., flowing from the vehicle front direction Fr to the vehicle rear direction Rr shown in FIG. 1) may be rectified, and the aerodynamic performance may thus be effectively improved.

To be specific, in this embodiment, as shown in FIG. 1 to FIG. 3B, the deflector panel 110 includes a front deflector panel 112 and a rear deflector panel 114. The front deflector panel 112 is provided in front of the pair of left and right front wheels 54 of the vehicle 50 (as shown in FIG. 1), the rear deflector panel 114 is provided between the pair of left and right front wheels 54 of the vehicle 50 (as shown in FIG. 1), and the front deflector panel 112 and the rear deflector panel 114 are connected to each other. That is, the front deflector panel 112 and the rear deflector panel 114 are respectively provided on the front side and the rear side in the vehicle front-rear direction. As such, the deflector panel 110 is divided into two parts (i.e., the front deflector panel 112 and the rear deflector panel 114) in the vehicle front-rear direction and thus may be set differently. For example, the front deflector panel 112 and the rear deflector panel 114 have different orientations in the unfolded position. Furthermore, the left and right sides of the front deflector panel 112 may be additionally provided with a pair of fairings 116 that can be driven between the stored position and the deployed position in the same manner as the front deflector panel 112. However, the arrangement of the fairings 116 is not limited in the disclosure.

Further, in this embodiment, as shown in FIG. 2 and FIG. 3A, the vehicle body 52 includes a front frame 52a and a rear frame 52b connected to each other. The front deflector panel 112 is rotatably arranged on the vehicle body 52 with a front end 112a thereof (e.g., the end portion corresponding to the vehicle front direction Fr in FIG. 2 and FIG. 3A) along a first rotation axis A1 extending in the vehicle left-right direction. For instance, the front end 112a of the front deflector panel 112 is rotatably connected to the vehicle body 52 (for example, arranged on the front frame 52a) via a first axis member 120a (shown in FIG. 3A) extending along the first rotation axis A1. Therefore, the front frame 52a supports the front deflector panel 112 to be rotatable via the first rotation axis A1. Further, a rear end 112b (for example, corresponding to the end portion in the vehicle rear direction Rr in FIG. 2 and FIG. 3) of the front deflector panel 112 is connected to a front end 114a of the rear deflector panel 114 (as described later). Herein, the front end and the rear end are two opposite portions on the deflector panel, but are not limited to the vicinity of the edge of the deflector panel, and the specific positions may be adjusted according to needs.

Accordingly, in this embodiment, as shown in FIG. 2 and FIG. 3A, the rear deflector panel 114 is rotatably arranged on the rear end 112b of the front deflector panel 112 along a second rotation axis A2 extending in the vehicle left-right direction with the front end 114a thereof and is rotatably and slidably arranged on the vehicle body 52 along a third rotation axis A3 extending in the vehicle left-right direction in the vehicle front-rear direction with a rear end 114b thereof. For instance, the front end 114a of the rear deflector panel 114 is rotatably connected to the rear end 112b of the front deflector panel 112 via a second axis member 120b (shown in FIG. 3A) extending along the second rotation axis A2. The rear end 114b of the rear deflector panel 114 is rotatably connected to the vehicle body 52 (for example, arranged on the rear frame 52b) via a third axis member 120c (shown in FIG. 3A) extending along the third rotation axis A3 and is slidably arranged on the vehicle body 52 in the vehicle front-rear direction (for example, the rear frame 52b of the vehicle body 52 is provided with a sliding groove (not shown) for sliding engagement with the third axis member 120c). As such, the rear frame 52b supports the rear deflector panel 114 to be rotatable via the third rotation axis A3 and slidable in the vehicle front-rear direction.

Therefore, in this embodiment, the first rotation axis A1, the second rotation axis A2, and the third rotation axis A3 are parallel to one another (extending in the vehicle left-right direction). Implementation of the of the first axis member 120a, the second axis member 120b, and the third axis member 120c may be the same or different. For instance, a single long shaft rod having the same width as the front deflector panel 112 or the rear deflector panel 114 is arranged, or a pair of short shaft rods arranged on the left and right sides of the front deflector panel 112 or the rear deflector panel 114 may be used. Such an arrangement is not limited in the disclosure and may be adjusted according to needs.

Through the above arrangement, in this embodiment, when the deflector panel 110 is located in the stored position (as shown in FIG. 3A), the front deflector panel 112 and the rear deflector panel 114 cover the lower portion of the vehicle body 52. Correspondingly, when the deflector panel 110 is located in the unfolded position (as shown in FIG. 3B), the front end 112a of the front deflector panel 112 rotates relative to the vehicle body 52 (e.g., the front frame 52a) about the first axis member 120a as the rotation axis (i.e., the first rotation axis A1), and the rear end 112b of the front deflector panel 112 moves downwards (e.g., the vehicle down direction D shown in FIG. 3B). At the same time, the front end 114a of the rear deflector panel 114 is driven by the rear end 112b of the front deflector panel 112 to move downwards, and the front end 114a of the rear deflector panel 114 rotates relative to the rear end 112b of the front deflector panel 112 with the second axis member 120b as the rotation axis (i.e., the second rotation axis A2). Therefore, the rear end 114b of the rear deflector panel 114 rotates relative to the vehicle body 52 (e.g., the rear frame 52b) with the third axis member 120c as the rotation axis (i.e., the third rotation axis A3), and the rear end 114b of the rear deflector panel 114 is driven by the front end 114a of the rear deflector panel 114 to slide forwards (i.e., one side corresponding to the vehicle front direction Fr in FIG. 3B).

It thus can be seen that in this embodiment, the deflector panel 110 used in the vehicle lower structure 100 is divided into the front deflector panel 112 and the rear deflector panel 114 in the vehicle front-rear direction (e.g., the vehicle front direction Fr and the vehicle rear direction Rr shown in FIG. 1 to FIG. 3B), and the front deflector panel 112 and the rear deflector 114 panel are connected to each other so as to be relatively rotatable. Therefore, the deflector panel 110 may be arranged such that the front deflector panel 112 and the rear deflector panel 114 are oriented differently in the unfolded position (as shown in FIG. 3B). That is, when the deflector panel 110 is located in the unfolded position, the front deflector panel 112 is presented to be the upper surface facing the rear, and the rear deflector panel 114 is presented to be the upper surface facing the front. Therefore, the front deflector panel 112 and the rear deflector panel 114 form a V-shape, and the flow velocity of the airflow may be increased along the deflector panel 110, but the disclosure is not limited thereto. Accordingly, the vehicle lower structure 100 may rectify the airflow on the deflector panel 110, and the aerodynamic performance may thus be improved.

The movement of the deflector panel 110 from the stored position (as shown in FIG. 3A) to the unfolded position (as shown in FIG. 3B) may be executed according to the user's (e.g., the driver of the vehicle 50) instructions through software devices (e.g., a drive unit or a control unit mounted in the vehicle 50) together with hardware devices (not shown, e.g., an operation interface), but other operational manners (e.g., manual operation) are not excluded in the disclosure. Further, the movement of the deflector panel 110 from the unfolded position (shown in FIG. 3B) to the stored position (shown in FIG. 3A) is the reverse operation according to the foregoing description. That is, the front end 112a of the front deflector panel 112 rotates in the opposite direction with respect to the vehicle body 52 (e.g., the front frame 52a), and the rear end 112b of the front deflector panel 112 moves upwards and returns to the state covering the lower portion of the vehicle body 52. At the same time, the front end 114a of the rear deflector panel 114 is driven by the rear end 112b of the front deflector panel 112 to move upwards and return to the state of covering the lower portion of the vehicle body 52. Further, the rear end 114b of the rear deflector panel 114 is pushed by the front end 114a of the rear deflector panel 114 to slide rearwards (i.e., one side corresponding to the vehicle rearward direction Rr in FIG. 3B). However, the disclosure is not limited to the above-mentioned operation manner, which can be adjusted according to needs.

Further, in this embodiment, as shown in FIG. 2 and FIG. 3A, the vehicle lower structure 100 further includes a guide structure 130. The guide structure 130 is disposed between the vehicle body 52 (e.g., the rear frame 52b) and the rear deflector panel 114 to guide the movement of the deflector panel 110 to the unfolded position (as shown in FIG. 3B). Herein, the guide structure 130 is disposed between the front end 114a and the rear end 114b of the rear deflector panel 114. Therefore, when the deflector panel 110 moves to the unfolded position (as shown in FIG. 3B), the guide structure 130 also moves (as shown in FIG. 3A and FIG. 3B), so that the guide structure 130 may be used to guide the movement of the deflector panel 110 to the deployed position (as shown in FIG. 3B).

To be specific, as shown in FIG. 4 to FIG. 8, FIG. 4 and FIG. 5 are cross-sectional views of the guide structure 130 after being assembled, and FIG. 6 to FIG. 8 are schematic views of the components after the guide structure 130 is disassembled. In the present embodiment, the guide structure 130 includes a guide member 132, a covering portion 134, and a concave portion 136. The rear deflector panel 114 is provided with the guide member 132 protruding upwards (e.g., the vehicle up direction U shown in FIG. 4 to FIG. 6), and the guide member 132 is covered from above by the covering portion 134 formed on the vehicle body 52. Further, the guide member 132 has a guide pin 132a extending in the vehicle left-right direction. The covering portion 134 has guide groove 134a corresponding to the guide pin 132a. The guide pin 132a is provided in the guide groove 134a and is configured to be movable along the guide groove 134a. Further, the covering portion 134 is arranged to be embedded in the concave portion 136 to improve stability. However, the disclosure is not limited thereto, and adjustment can be made according to needs.

Further, in this embodiment, as shown in FIG. 6, the guide member 132 is disposed on the rear deflector panel 114, and the guide member 132 protrudes upwards and is configured as, for example, a guide base to allow the guide pin 132a to be described later to be arranged. Further, the guide pin 132a extending in the vehicle left-right direction is arranged on the outer surface of the guide member 132, and the guide pin 132a preferably protrudes towards the vehicle outer side (i.e., the guide member 132 located in the vehicle right direction R is provided with the guide pin 132a protruding in the vehicle right direction R on its outer side corresponding to the vehicle right direction R, and so on), but it is not limited thereto.

Moreover, in this embodiment, as shown in FIG. 7, the covering portion 134 is arranged on the rear frame 52b, and the covering portion 134 has an inner space S and is configured as a lid-like structure that is open on the lower side (i.e., one side corresponding to the vehicle down direction D). Therefore, the guide groove 134a corresponding to the guide pin 132a is provided on the outer side surface of the covering portion 134, the guide groove 134a communicates with the inner space S of the covering portion 134 and is preferably open in the vehicle outer direction, but it is not limited thereto.

As such, in this embodiment, as shown in FIG. 4 and FIG. 5, the guide member 132 provided on the rear deflector panel 114 is covered by the covering portion 134 provided on the rear frame 52b. For instance, the rear deflector panel 114 is attached onto the rear frame 52b from below to above, so that the guide member 132 provided on the rear deflector panel 114 penetrates into the inner space S of the covering portion 134 from below the covering portion 134 provided on the rear frame 52b. In this way, the covering portion 134 having a lid-like structure covers the guide member 132 from above and further covers the guide member 132 from the left and right sides. Further, the guide pin 132a provided in the guide member 132 is inserted into the guide groove 134a provided in the covering portion 134 towards the outside.

In this way, the rear deflector panel 114 and the rear frame 52b are connected to the covering portion 134 via the guide member 132 and move along the guide groove 134a via the guide pin 132a. The guide member 132 moves relative to the covering portion 134, so that the guide member 132 can guide the movement of the rear deflector panel 114 relative to the rear frame 52b of the vehicle body 52. Further, by covering the guide member 132 from above via the covering portion 134, the connection between the covering portion 134 and the guide member 132 may be strengthened, and the process of moving the guide pin 132a along the guide groove 134a may be more stable. In addition, the guide pin 132a may not be easily detached from the covering portion 134 due to the deformation of the rear deflector panel 114. However, the disclosure is not limited to the abovementioned implementation, and the specific shapes of the guide member 132 and the covering portion 134, the shape of the guide pin 132a, and the trajectory of the guide groove 134a and so on may be adjusted according to needs.

Besides, in this embodiment, as shown in FIG. 7, the covering portion 134 is disposed on the rear frame 52b, and an upper end portion (i.e., the outside of the lid-like structure) of the covering portion 134 protrudes above the rear frame 52b. Further, the upper end portion of the covering portion 134 is provided with a concave hole 134b, an inclined surface 134c located in the vicinity of the concave hole 134b, and a stepped surface 134d located in the vehicle outer direction of the inclined surface 134c. The concave hole 134b is preferably open upwards, the inclined surface 134c preferably corresponds to the direction of the guide groove 134a, and the stepped surface 134d is preferably lowered in height from the inclined surface 134c towards the vehicle outer side, but it is not limited thereto.

Further, in this embodiment, as shown in FIG. 8, the concave portion 136 is provided on the front frame 52a (preferably on the side surface of the front frame 52a corresponding to the vehicle inner direction), and the concave portion 136 is formed as a concave structure in which the front frame 52a is recessed from below to above. Further, the inner side of the concave portion 136 is provided with a convex column 136a, an inclined surface 136b located in the vicinity of the convex column 136a, and a stepped surface 136c located in the vehicle outer direction of the inclined surface 136b. The convex column 136a preferably extends downwards, the inclined surface 136b preferably corresponds to the direction of the inclined surface 134c, and the stepped surface 136c is preferably lowered in height from the inclined surface 136b towards the vehicle outer side, but it is not limited thereto.

As such, in this embodiment, as shown in FIG. 4 and FIG. 5, the covering portion 134 is arranged so as to be embedded in the concave portion 136 formed in the front frame 52a. For instance, the front frame 52a is attached onto the rear frame 52b from above to below, so that the concave portion 136 provided on the front frame 52a is connected to the upper end portion of the covering portion 134 from above the rear frame 52b, and that the covering portion 134 provided on the rear frame 52b is equivalent to being embedded in the concave portion 136 provided on the front frame 52a from below to above. Therefore, the convex column 36a provided on the inner side of the concave portion 136 penetrates into the concave hole 134b provided on the upper side of the covering portion 134 from above to below, and the inclined surface 136b provided on the inner side of the concave portion 136 corresponds to the inclined surface 134c provided on the upper side of the covering portion 134. Similarly, although not shown in the local cross-sectional schematic views of FIG. 4 and FIG. 5, the stepped surface 136c provided on the inner side of the concave portion 136 also corresponds to the stepped surface 134d provided on the upper side of the covering portion 134.

In this way, the rear frame 52b and the front frame 52a are connected to the concave portion 136 via the covering portion 134, and the covering portion 134 is embedded in the concave portion 136 to improve stability. Further, the covering portion 134 and the concave portion 136 are fixed and limited to each other through the engagement of the concave hole 134b and the convex column 136a, the engagement of the inclined surface 134c and the inclined surface 136b, and the engagement of the stepped surface 134d and the stepped surface 136c to improve the stability of the covering portion 134. As such, the guide pin 132a may not be easily detached from the covering portion 134 due to the deformation of the rear deflector panel 114. However, the disclosure is not limited to the implementation provided above. The specific shapes of the covering portion 134 and the concave portion 136, the shapes of the concave hole 134b, the inclined surface 134c, and the stepped surface 134d, the shapes of the convex column 136a, the inclined surface 136b, and the stepped surface 136c, and whether the above structures are provided or not can be adjusted according to needs.

In view of the foregoing, in the vehicle lower structure provided by the disclosure, the deflector panel is divided into the front deflector panel and the rear deflector panel. When the deflector panel is in the unfolded position, the rear deflector panel slides forwards through the guidance of the guide member, so that the flow velocity of the airflow may be increased along the deflector panel. Further, the rear deflector panel is provided with the guide member protruding upwards, and the guide member is covered from above by the covering portion formed on the vehicle body. Therefore, even if the rear deflector panel is deformed, the guide member may not be detached easily from the covering portion. Preferably, the covering portion is disposed on the rear frame and is configured to be embedded in the concave portion formed on the front frame. As such, both the front frame and the rear frame forming a portion of the vehicle body cover the guide member from above, and the stability of the guide member is thereby improved. Accordingly, the vehicle lower structure provided by the disclosure may rectify the airflow on the deflector panel to improve the aerodynamic performance and suppress the guide member provided on the deflector panel from being detached from the vehicle body.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A vehicle lower structure comprising a deflector panel provided on a vehicle body of a vehicle and movable between a stored position covering a lower portion of the vehicle body and an unfolded position protruding downwards, wherein
    the deflector panel comprises a front deflector panel and a rear deflector panel,
    the front deflector panel is rotatably arranged on the vehicle body along a first rotation axis with a front end thereof,
    the rear deflector panel is rotatably arranged on a rear end of the front deflector panel along a second rotation axis with a front end thereof and is rotatably and slidably arranged on the vehicle body along a third rotation axis in a vehicle front-rear direction with a rear end thereof,
    the rear deflector panel is provided with a guide member protruding upwards, and
    the guide member is covered from above by a covering portion formed on the vehicle body.

2. The vehicle lower structure according to claim 1, wherein
    the guide member has a guide pin extending in a vehicle left-right direction,
    the covering portion has guide groove corresponding to the guide pin, and
    the guide pin is provided in the guide groove and is configured to be movable along the guide groove.

3. The vehicle lower structure according to claim 1, wherein
    the vehicle body comprises a front frame and a rear frame connected to each other,
    the front frame supports the front deflector panel to be rotatable via the first rotation axis, and
    the rear frame supports the rear deflector panel to be rotatable via the third rotation axis and slidable in the vehicle front-rear direction.

4. The vehicle lower structure according to claim 3, wherein
    the covering portion is disposed on the rear frame and is configured to be embedded in a concave portion formed on the front frame.

5. The vehicle lower structure according to claim 2, wherein
    the vehicle body comprises a front frame and a rear frame connected to each other,
    the front frame supports the front deflector panel to be rotatable via the first rotation axis, and
    the rear frame supports the rear deflector panel to be rotatable via the third rotation axis and slidable in the vehicle front-rear direction.

6. The vehicle lower structure according to claim 5, wherein
    the covering portion is disposed on the rear frame and is configured to be embedded in a concave portion formed on the front frame.

* * * * *